(12) United States Patent
Ou

(10) Patent No.: US 11,604,589 B2
(45) Date of Patent: *Mar. 14, 2023

(54) CONFIGURABLE BUFFER MANAGER ARBITRATION REQUEST THROTTLING MECHANISM

(71) Applicant: Micron Technology, Inc., Boise, ID (US)

(72) Inventor: Michael Ou, Newark, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/200,404

(22) Filed: Mar. 12, 2021

(65) Prior Publication Data

US 2021/0200457 A1    Jul. 1, 2021

Related U.S. Application Data

(63) Continuation of application No. 16/140,990, filed on Sep. 25, 2018, now Pat. No. 10,969,978.

(51) Int. Cl.
*G06F 3/06* (2006.01)
*G06F 12/0802* (2016.01)

(52) U.S. Cl.
CPC .......... *G06F 3/0634* (2013.01); *G06F 3/0605* (2013.01); *G06F 3/0656* (2013.01); *G06F 3/0679* (2013.01); *G06F 12/0802* (2013.01)

(58) Field of Classification Search
CPC .... G06F 3/0634; G06F 3/0605; G06F 3/0656; G06F 3/0679; G06F 12/0802
See application file for complete search history.

(56) References Cited

U.S. PATENT DOCUMENTS

| | | | | |
|---|---|---|---|---|
| 6,470,238 | B1* | 10/2002 | Nizar | G06F 13/1668 |
| | | | | 702/130 |
| 6,948,113 | B1* | 9/2005 | Shaver | G06F 3/0613 |
| 7,159,082 | B1* | 1/2007 | Wade | G06F 1/3225 |
| | | | | 711/155 |
| 7,337,248 | B1 | 2/2008 | Rao et al. | |
| 8,683,089 | B1* | 3/2014 | Wong | G06F 13/1642 |
| | | | | 710/36 |
| 2005/0172084 | A1 | 8/2005 | Jeddeloh | |

(Continued)

OTHER PUBLICATIONS

U.S. Appl. No. 16/140,990, Non Final Office Action dated Feb. 13, 2020, 26 pgs.

(Continued)

*Primary Examiner* — Nanci N Wong
(74) *Attorney, Agent, or Firm* — Schwegman Lundberg & Woessner, P.A.

(57) ABSTRACT

A throttling value is determined according to one of multiple throttling modes. A threshold value is determined. The throttling value is compared to the threshold value. A request mask is generated based on a result of the comparison of the throttling value to the threshold value. In response to detecting the request mask, an arbitration request is masked using the request mask prior to passing the arbitration request to an arbitration component that manages access of multiple client requestors to a buffer. The arbitration request is generated in response to receiving an access request for the buffer from a client requestor of the multiple client requestors.

20 Claims, 7 Drawing Sheets

(56) References Cited

U.S. PATENT DOCUMENTS

| | | | |
|---|---|---|---|
| 2009/0052266 A1* | 2/2009 | Askar | G06F 13/161 |
| | | | 365/212 |
| 2012/0079228 A1* | 3/2012 | Chen | H03K 21/38 |
| | | | 711/E12.001 |
| 2012/0105050 A1* | 5/2012 | Naffziger | G06F 1/3206 |
| | | | 324/103 R |
| 2018/0173464 A1* | 6/2018 | Wongso | G06F 3/0614 |
| 2020/0097202 A1 | 3/2020 | Ou | |

OTHER PUBLICATIONS

U.S. Appl. No. 16/140,990, Responee filed May 12, 2020 to Non Final Office Action dated Feb. 13, 2020, 11 pgs.

U.S. Appl. No. 16/140,990, Final Office Action dated May 28, 2020, 30 pgs.

U.S. Appl. No. 16/140,990, Response filed Jul. 28, 2020 to Final Office Action dated May 28, 2020, 10 pgs.

U.S. Appl. No. 16/140,990, Examiner Interview Summary dated Aug. 10, 2020, 3 pgs.

U.S. Appl. No. 16/140,990, Advisery Action dated Aug. 12, 2020, 2 pgs.

U.S. Appl. No. 16/140,990, Notice of Allowance dated Dec. 7, 2020, 9 pgs.

* cited by examiner

CONFIGURABLE BUFFER MANAGER ARBITRATION REQUEST THROTTLING MECHANISM

PRIORITY APPLICATION

This application is a continuation of U.S. application Ser. No. 16/140,990, filed Sep. 25, 2018, which is incorporated herein by reference in its entirety.

TECHNICAL FIELD

Embodiments of the disclosure relate generally to memory sub-systems and, more specifically, to a configurable buffer manager arbitration request throttling mechanism for a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
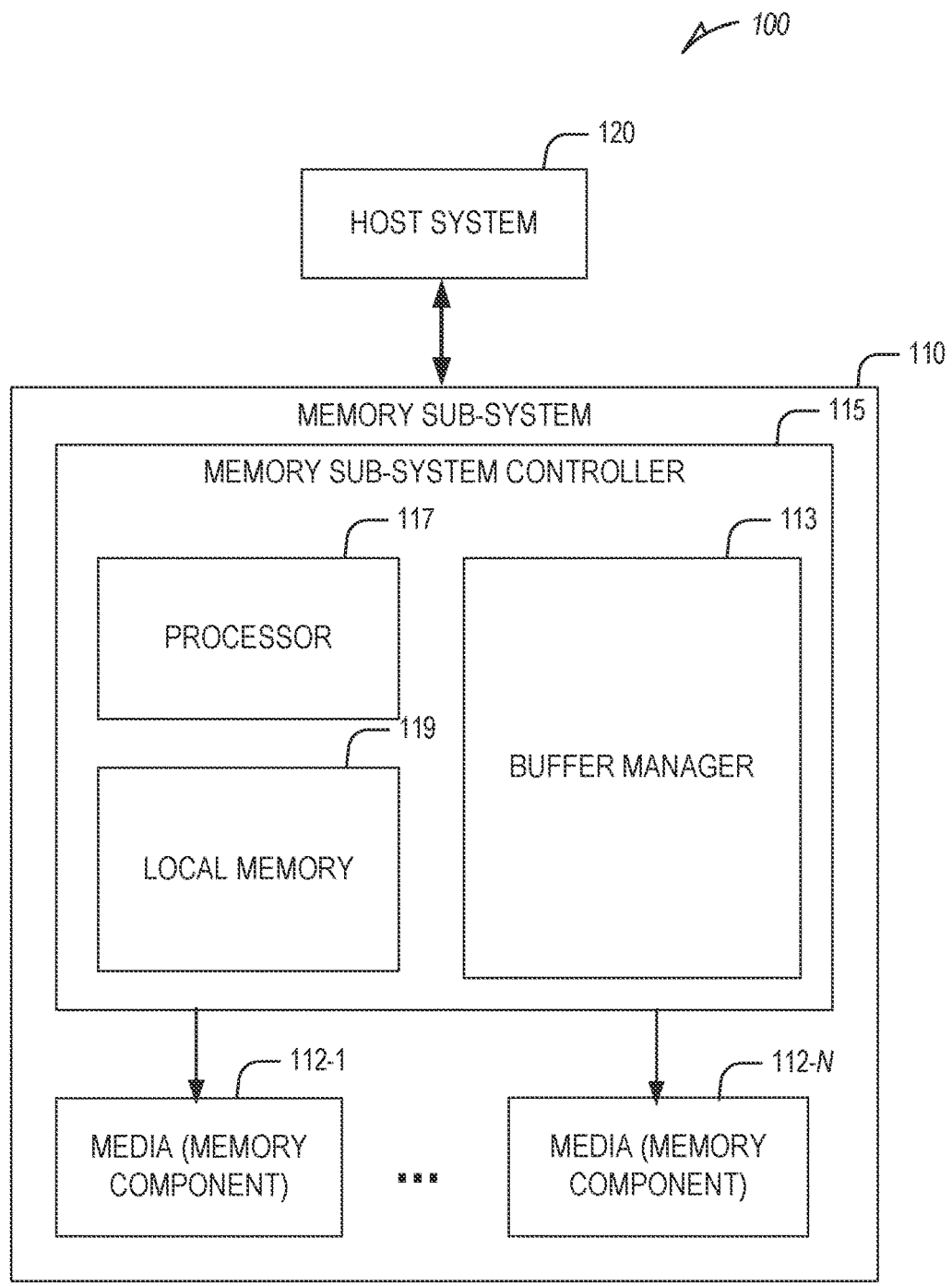
FIG. 1 illustrates an example computing environment that includes a memory sub-system, in accordance with some embodiments of the present disclosure.

Aspects of the present disclosure are directed to class-based dynamic memory slot allocation in a memory sub-system. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

In many instances, one or more of the memory components of the memory sub-system can be configured as a buffer memory to store user and system data. Such memory components can be shared by multiple clients. The memory sub-system can include a buffer manager to control the buffer memory components. The buffer manager is responsible for managing read and write transfer requests received from the multiple clients. The buffer manager can include an arbiter component to select which client has access to the buffer manager during each clock cycle.

In a configurable parameterizable buffer manager architecture, a configurable number of client requestors are connected to the buffer manager to make requests to a shared memory component. The requested access is for a fixed portion of the memory component. In buffer configuration with multiple memory banks, for example, the requested access can be for a memory "stripe." The term "stripe" may be used to refer to a single slice of memory with the same address across all memory banks. For example, in an 8-bank memory configuration with each bank being 16-bytes wide, a stripe request would consist of an access from the same memory bank address across all banks, which would be 128 bytes in this configuration. In buffer configurations with multiple memory banks, the requests are pipelined along the memory bank structure so that each request reads from a single memory bank during one clock cycle, and multiple requests from different client requestors occur in parallel across the multiple memory banks.

In many scenarios, client requestors are both independent and greedy, and often request as much of the shared memory resource as possible without regard to other client requests. When the number of requests exceeds the number of available resources, the buffer manager will not be able to provide full throughput to every client. This means that all clients may experience reduced throughput. As example, consider a buffer manager with 8 individual memory banks, each which can process up to 16 bytes per clock cycles and which run at 500 Mhz. Each individual bank can be accessed simultaneously by one client, so up to 8 banks can be accessed by 8 different clients. This provides a maximum theoretical throughput of 8 GB (500 Mhz*16 bytes) per second, which when multiplied across the 8 banks equates to 64 GB throughput per second. If there are 16 clients all actively requesting, since only 8 out of 16 clients will be able to access the 8 banks in a given clock cycle, each client will only achieve 50% bandwidth or 4 GB max.

Reduced throughput from all requesting clients is often an accepted condition in many memory sub-systems, but in certain situations, some clients may need a minimum guaranteed level of throughput while other clients may accept a lower level of throughput. The minimum guaranteed level of throughput for various clients may also dynamically change during system operation, so there is a need for system firmware to be able to consistently make adjustments on-the-fly depending on current request and performance profiles.

Additionally, from a test and verification perspective, it is desirable to provide some controllability to mimic different types of traffic patterns for buffer manager arbitration and data flow. Testing a full system running with all clients active is usually more difficult to control and manage, and simulation performance is significantly slower. Many problems can be found by running a smaller level of testing through a single client or a small subset of active clients in the test bench. However, in these smaller client configuration test benches, there needs to be a way to mimic the different burst and random traffic patterns as seen by the single or small subset of requesting clients.

Aspects of the present disclosure address the above and other deficiencies by providing a buffer manager having a control mechanism to throttle client requests. In particular, a throttling component conditionally masks out requests from a client to allow other client requests to have arbitration granted over the masked out requests. The conditional masking is performed by the throttling component on clock cycle-by-clock cycle basis. Since masking is performed on a clock cycle-by-clock cycle basis, the throttling component improves upon conventional buffer managers by allowing fine grain control over how requests are issued to the buffer manager's arbiter, thus allowing the ability to create custom profiles on how requests are masked off or granted. As a further improvement to conventional buffer managers, the per-clock cycle request and arbitration grant described as part of the present disclosure also allows for on-the-fly control of how masking is enabled or disabled, since a configuration change will be automatically reflected in the following clock cycle.

The buffer manager can include a throttling control component for each client requestor. Each throttling control can generate a request mask during each clock cycle, which can mask off the client request when asserted. This simplifies the interaction between the client bridge and the arbiter compared to conventional buffer managers since the mask signal hides the request from the arbiter allowing it to select between any remaining valid requesting client bridges. Each throttling control component is capable of operating in multiple throttling modes, which dictate how and when the throttling component masks request. The throttling mode of any given throttling component can be configured on-the-fly to accommodate for changes in arbitration request frequency.

The multiple throttling modes can be particularly advantageous in testing and qualification in design verification contexts. For example, in system-wide testing, a complete memory system with all requesting clients and a buffer manager is simulated to model the real system interaction. However, the large scale of testing is often cumbersome and extremely slow since modeling the entire system and all its active components consumes an enormous amount of computer resources and memory. It is also hard to configure and program all system components to mimic how they will function in the final product, as the block interactions can be more difficult to control.

To speed up testing and simulation, the test environment is often split up into very small subsystems, often consisting of a single or a small handful of clients interacting with the buffer manager. Smaller scale testing runs much faster and is much more controllable. However, the problem with the smaller test environment is that these systems do not model real arbitration delays. More specifically, the number of requestors to the shared buffer manager is usually much less than the available resources, meaning the requestors may never see real arbitration delays that would be present in a larger system. For example, in a single requestor test environment, the requestor will always get arbitration and never have to wait for other requestors to get their requests processed.

Configuring a throttling control component with one of the multiple throttling modes acts as a much better model of the actual system delays that a single requestor can encounter. This can help to uncover real system problems in the block level test bench. Certain throttling modes can also allow for testing how a single requestor in its block environment handles the situation of other high priority requestors consuming all system bandwidth.

FIG. 1 illustrates an example computing environment 100 that includes a memory sub-system 110, in accordance with some embodiments of the present disclosure. The memory sub-system 110 can include media, such as memory components 112-1 to 112-N. The memory components 112-1 to 112-N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCe) interface, universal serial bus (USB) interface. Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative-and (NAND) type flash memory. Each of the memory components 112-1 to 112-N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, as noted above, the memory cells of the memory components 112-1 to 112-N can be grouped as data blocks that can refer to a unit of the memory component used to store data.

A memory sub-system controller 115 (hereinafter referred to as "controller") can communicate with the memory components 112-1 to 112-N to perform operations such as reading data, writing data, or erasing data at the memory components 112-1 to 112-N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system into command instructions to access the memory components 112-1 to 112-N as well as convert responses associated with the memory components 112-1 to 112-N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112-1 to 112-N.

The memory sub-system 110 includes a buffer manager 113 that manages access to a buffer memory and services multiple client requestors. The buffer memory can be included in the controller 115 or any one or more of the memory components 112-1 to 112-N. In some embodiments, the controller 115 includes at least a portion of the buffer manager 113. For example, the controller 115 can include a processor 117 (processing device) configured to execute instructions stored in local memory 119 for performing the operations described herein. In some embodiments, the buffer manager 113 is part of the host system 110, an application, or an operating system.

The buffer manager 113 manages read and write transfer requests for buffer memory components received from a configurable number of requestors (also referred to as "clients"). The buffer manager 113 includes an arbiter component that selects which client has access to the buffer manager each clock cycle. For each client, the arbiter component includes a throttling control component that is configured to conditionally mask requests from the client to allow requests from other clients to be serviced. The throttling control component determines whether to mask requests on a clock cycle by clock cycle basis. That is, at each clock cycle, the throttling control component can decide to generate a request mask to mask an incoming request. The throttling control component is capable of being programmed according to one of multiple throttling modes and the throttling control component decides whether to generate a request mask at each clock cycle in accordance with a throttling mode to which the throttling control component is programmed. Further details with regards to the operations of the buffer manager 113 are described below.

Figure 2:
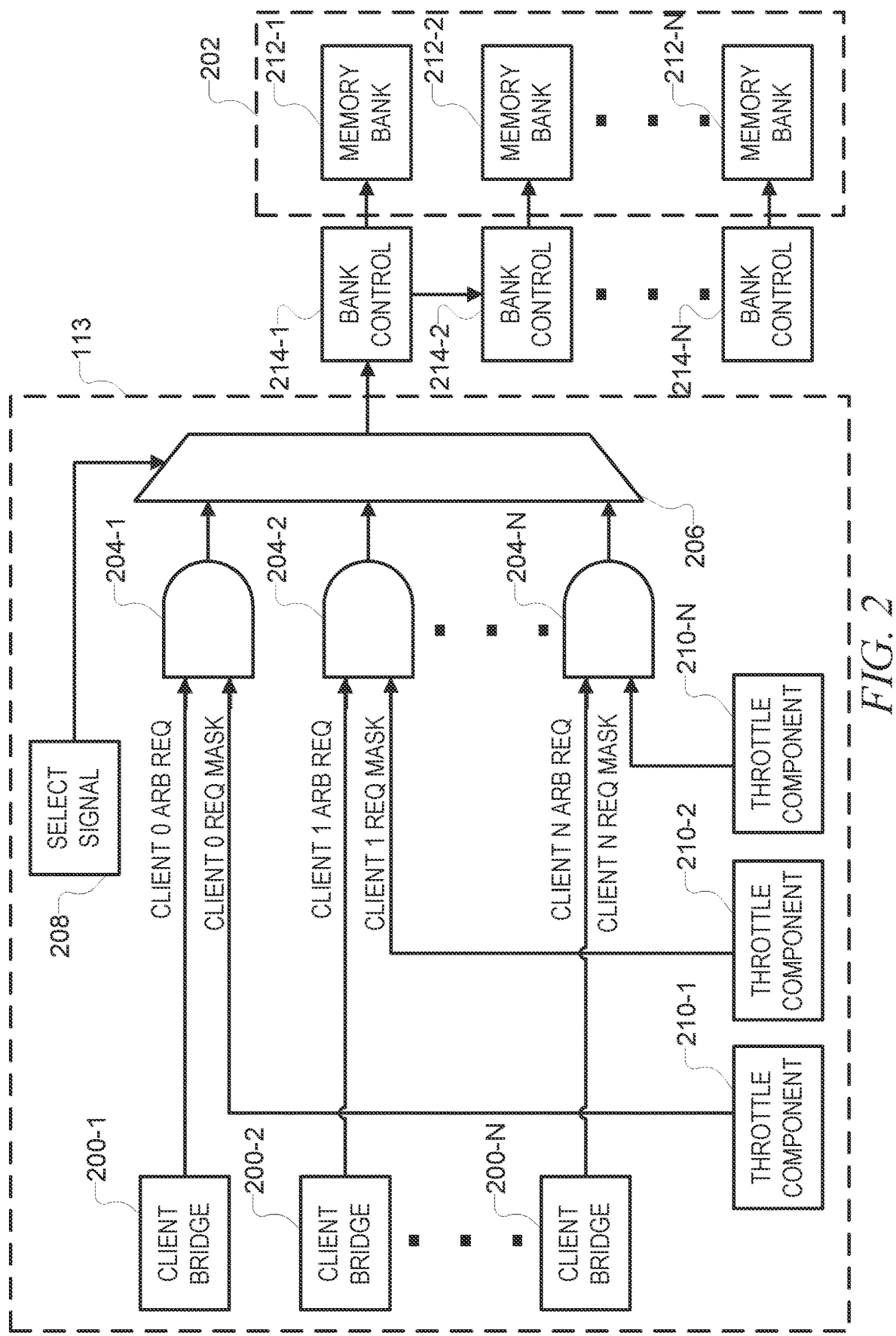
FIG. 2 is a block diagram illustrating components of a buffer manager, in accordance with some embodiments of the present disclosure.

FIG. 2 is a block diagram illustrating components of the buffer manager 113, in accordance with some embodiments of the present disclosure. As shown, the buffer manager 113 includes client bridges 200-1 to 200-N. The client bridges 200-1 to 200-N present a uniform interface to the external clients of the buffer manager 113. A client bridge 200 exists for each external client, and provides an interface to the buffer manager 113 for the corresponding client. That is, the clients make stripe requests (e.g., read or write) to the buffer manager 113 through their connected client bridge 200.

Each client bridge 200 packs incoming requests into a 64-bit command word and stores this in an input command/data first-in, first-out (FIFO) for processing. For write requests, the write data is also stored in the command/data FIFO. In response to receiving a client request, the receiving client bridge 200 outputs an arbitration request. Once arbitration is granted, the write data is immediately sent out of the command/data FIFO in the following clock cycle and stored in a buffer memory 202. When some or all data has been processed for that request, any subsequent requests stored in the FIFO can be executed.

For read requests, once the arbitration request is granted by the buffer manager 113, the data transfer from the buffer memory 202 immediately begins. Data being read from the memory components 12-1 to 112-N will be stored in an incoming FIFO. This data will be then streamed out and sent to the requesting client on its clock domain.

Arbitration requests output by each of the client bridges 200-1 are received at a corresponding masking component. For example, as shown, the buffer manager 113 includes masking components 204-1 to 204-N. Each of the masking components 204-1 to 204-N can receive two inputs—an arbitration request and a request mask. If a request mask is provided at its input, the masking component 204 masks the arbitration request. If no request mask is provided at its input, the masking component 204 passes the arbitration request on to an arbiter 206.

For each of the masking components 204-1 to 204-N, a throttling component 210 is provided to conditionally generate request masks for arbitration requests sent by the corresponding masking component 204. For example, as shown, the buffer manager 113 includes throttling components 210-1 to 210-N. Each of the throttling components 210-1 to 210-N are programmable according to one of multiple throttling modes, which dictate the conditions under which the request mask is generated. Further details regarding the throttling component 210 are discussed below in reference to FIG. 3.

The arbiter 206 selects which client has access to the buffer memory 204 at each clock cycle. As shown, the arbiter 206 receives a select signal 208. The select signal 208 provided to the arbiter 206 dictates which client has access to the buffer memory 202 at each clock cycle. The select signal 208 can, for example, employ a round robin scheme. If an unmasked arbitration request is provided by the selected client at an input of the arbiter 206, the request is granted and the client is granted access to the buffer memory 202 for that clock cycle. Otherwise, the selected client is denied access to the buffer memory 202 for that clock cycle.

The buffer memory 202 comprises memory banks 212-1 to 212-N. The memory banks 212-1 to 212-N can be spread across one of more of the memory components 112-1 to 112-N. Each stripe request received from a client is for the same memory address across all memory banks 212-1 to 212-N. Memory bank controls 214-1 to 214-N respectively process requests received from the buffer manager 113 for the memory banks 212-1 to 212-N.

Figure 3:
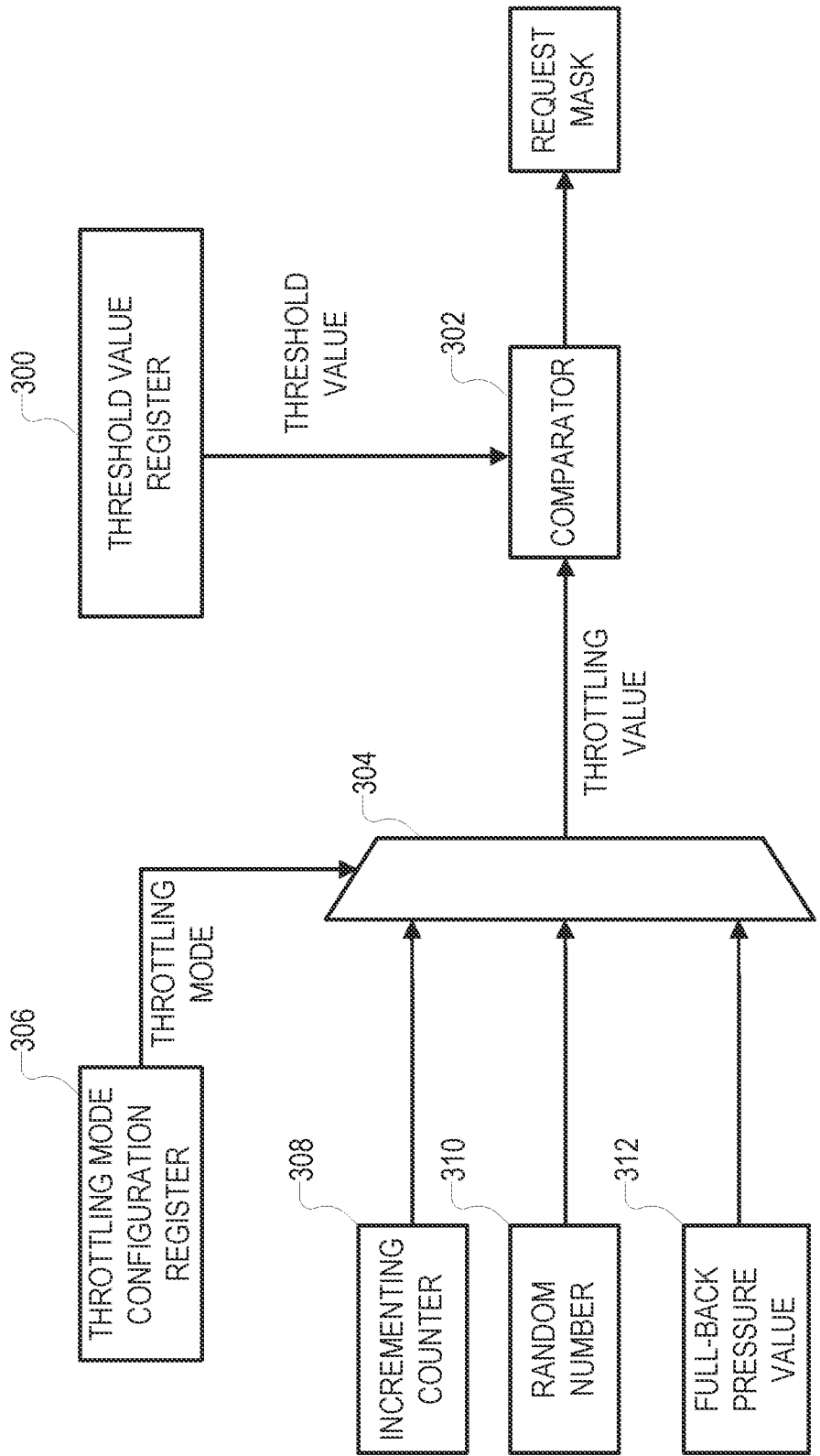
FIG. 3 is a block diagram illustrating sub-components of a client throttling component, which is provided as part of the buffer manager, in accordance with some embodiments of the present disclosure.

FIG. 3 is a block diagram illustrating sub-components of a client throttling component 210, which is provided as part of the requestor arbitration control, in accordance with some embodiments of the present disclosure.

The client throttling component 210 includes a threshold value register 300 that stores a threshold value. During each clock cycle, a comparator 302 compares the threshold value to a throttling value output by a throttling value selector 304. If the throttling value is less than the threshold value, the comparator 302 generates and outputs a request mask during that clock cycle. Otherwise, no request mask is generated for that clock cycle and, if an arbitration request is received from the corresponding client during that clock cycle, the arbitration is passed on the arbiter 206, as discussed above in reference to FIG. 2.

The throttling value output by the throttling value selector 304 depends on a programmable throttling mode of the client throttling component 210, which is represented by a throttling mode value stored in a throttling mode configuration register 306. As noted above, each client throttling component 210 is capable of being programmed according to one of multiple throttling modes. The throttling modes can, for example, include a counter-based mode, a random number-based mode, and a full-back pressure mode.

In a counter-based throttling mode, the throttling value selector 304 outputs a counter 308 as the throttling value. The client control throttling component 210 can increment the counter 308 on a per clock cycle or per request basis. In other words, the client control throttling component 210 can increment the counter 308 at each clock cycle or each time an arbitration request is received from a corresponding client bridge 200. The counter 308 is incremented until it reaches a maximum value (based on counter width) and then it rolls over back to zero.

In the counter-based throttling mode, if the counter 308 is less than the compare threshold value, the comparator 302 generates a request mask to gate off a request to the arbiter 206. When the counter 308 is greater than the threshold value, the request mask is de-activated to allow a request to pass through to the arbiter 206.

The counter-based throttling mode allows requests to be completely throttled across a large time window. For example, if the maximum value of the counter 308 is 64 and the compare value threshold is set to 32, then for the first 32 arbitration clock cycles, the client request that is being handled by the client throttling component 210 will get no arbitration. In the next 32 clock cycles, the client request would get its normal arbitration. This would model the situation where a requestor did not get arbitration granted across longer time windows.

The counter-based throttling mode also allows for a lower bandwidth priority client to have its requests scaled back when firmware of the memory sub-system 110 firmware deems it necessary to allow other higher bandwidth priority clients to obtain more bandwidth. For example, in an 8-bank, 16-byte wide memory bank system running at 500 Mhz, with 4 higher priority clients and 8 lower priority clients all making simultaneous requests, the normal achieved bandwidth spread for all 12 requestors spread across 8-banks would be 67% (i.e., 8/12) of maximum throughput for the buffer manager 113 (5.33 GB per client). However, the counter-based throttling mode could be used in this situation to set the 8 lower priority clients with a threshold of 50%, or more of the maximum counter value, which would reduce their requests by 50%. This means the effective requests being presented to the arbiter 206 would be 8 (4 higher priority requests+(8 requestors*0.50 requests due to throttling)), which would allow the higher priority clients to get a maximum bandwidth of 8 GB per client and would allow the 8 lower priority clients to get less bandwidth (4 GB per client).

In a random number based mode, the throttling value selector 304 outputs a random (or pseudo-random) number 310 as the throttling value. The random (or pseudo-random) number 310 is generated by a random number generator (not shown). In some embodiments, the random number generator is a linear feedback shift register (LFSR) based random number generator that includes one or more LFSRs. Consistent with these embodiments, the LFSR-based random number generator generates a pseudo-random number sequence, with the random number range based on the width of the LFSR registers used. During each clock cycle, the comparator 302 compares the threshold value against the generated random number 310. When the random number 310 is lower than the threshold value, the comparator 302 generates a request mask for that clock cycle. If the random number 310 is higher than the threshold value, the request mask is de-activated, and a request is allowed to pass through to the arbiter 206.

An advantage of the random number-based mode is that it can simulate a more random traffic profile, where occasionally the requestor may get its requests partially throttled at any given clock cycle, as opposed to within a larger time window as seen in the counter-based mode. The percentage of throttling is based on the programmable threshold value. For example, if the random number range is 0-63 and the compare threshold value is set to 16, then 25% (i.e., 16/64) of the requests are throttled in a random manner across the entire time window. If the request threshold is set to 48, then 75% (i.e., 48/64) of the requests are throttled in a random manner across the entire time window. This same method is also usable as an alternate throttling mechanism similar to the counter-based method, where higher bandwidth priority clients are able to get more guaranteed throughput over lower bandwidth priority clients by having the lower priority clients have their threshold values set to some higher percentage to throttle their requests.

In a full-back pressure mode, a full-back pressure value 312 that is less than the compare threshold value is used as the throttling value. In this manner, while in the full-back pressure mode, the comparator 302 will generate a request mask at each clock cycle so that all requests will be blocked. In this mode, the requestor gets no access to the arbiter 206 until the throttling mode is changed by the firmware of the memory sub-system 110. This mode can be used to restrict a client from taking up any amount of bandwidth until the firmware decides to allow that client to proceed.

Since the threshold value and throttling value are compared each clock cycle and there is no dependency on previous clock cycles, the values can be changed at any time by the CPU to control throttling on-the-fly. In addition, the throttling mode can also be changed at any time on the fly. The threshold value and the throttling mode are configurable through a standard CPU peripheral programming interface. In some embodiments, the interface is an advanced microcontroller bus architecture (AMBA) Advanced Peripheral Bus (APB).

Figure 4:
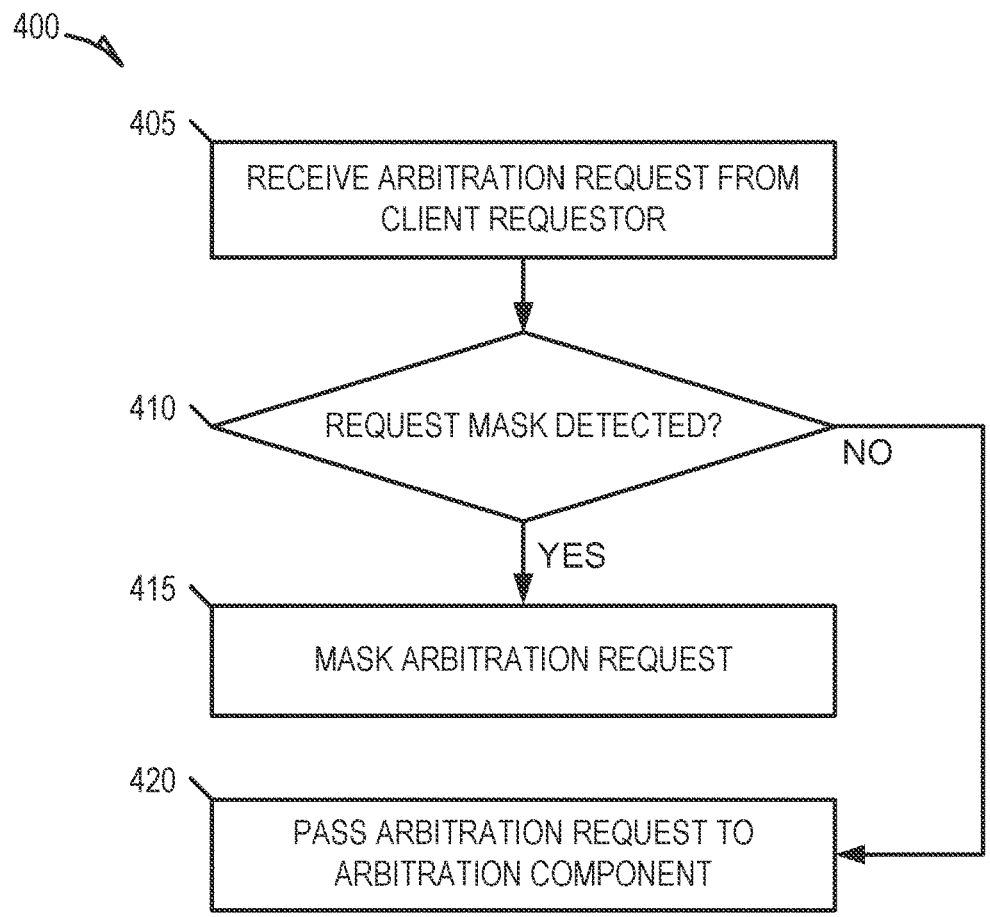
FIG. 4 is a flow diagram of an example method to throttle arbitration requests, in accordance with some embodiments of the present disclosure.

FIG. 4 is a flow diagram of an example method to throttle arbitration requests, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the buffer manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives an arbitration request from a client requestor. Prior to passing the arbitration request to an arbitration component (e.g., the arbiter 206), the processing device, at operation 410, determines whether a request mask is detected. If, at operation 410, the processing device detects a request mask, the processing device, at operation 415, masks the arbitration request using the request mask prior to passing the arbitration request to the arbitration component. Because the arbitration request is masked, the arbitration component will not see the arbitration request, and thus the client requestor will not be granted arbitration for the clock cycle. If, on the other hand, the processing device does not detect the request mask, the processing device, at operation 420, passes the arbitration request to the arbitration component for arbitration.

It shall be understood that the method 400 is described above in reference to a single client requestor during a single clock cycle, though it shall be appreciated that the method 400 can be performed for each client requestor each clock cycle. Thus, while a certain client requestor may be denied arbitration during a particular clock cycle due to requesting masking, the client requestor may be granted arbitration in subsequent clock cycles. Further, while a certain client requestor's request may be masked during a particular clock cycle, one or more other client requestors' requests may be passed on to the arbitration component during the same clock cycle without masking.

Figure 5:
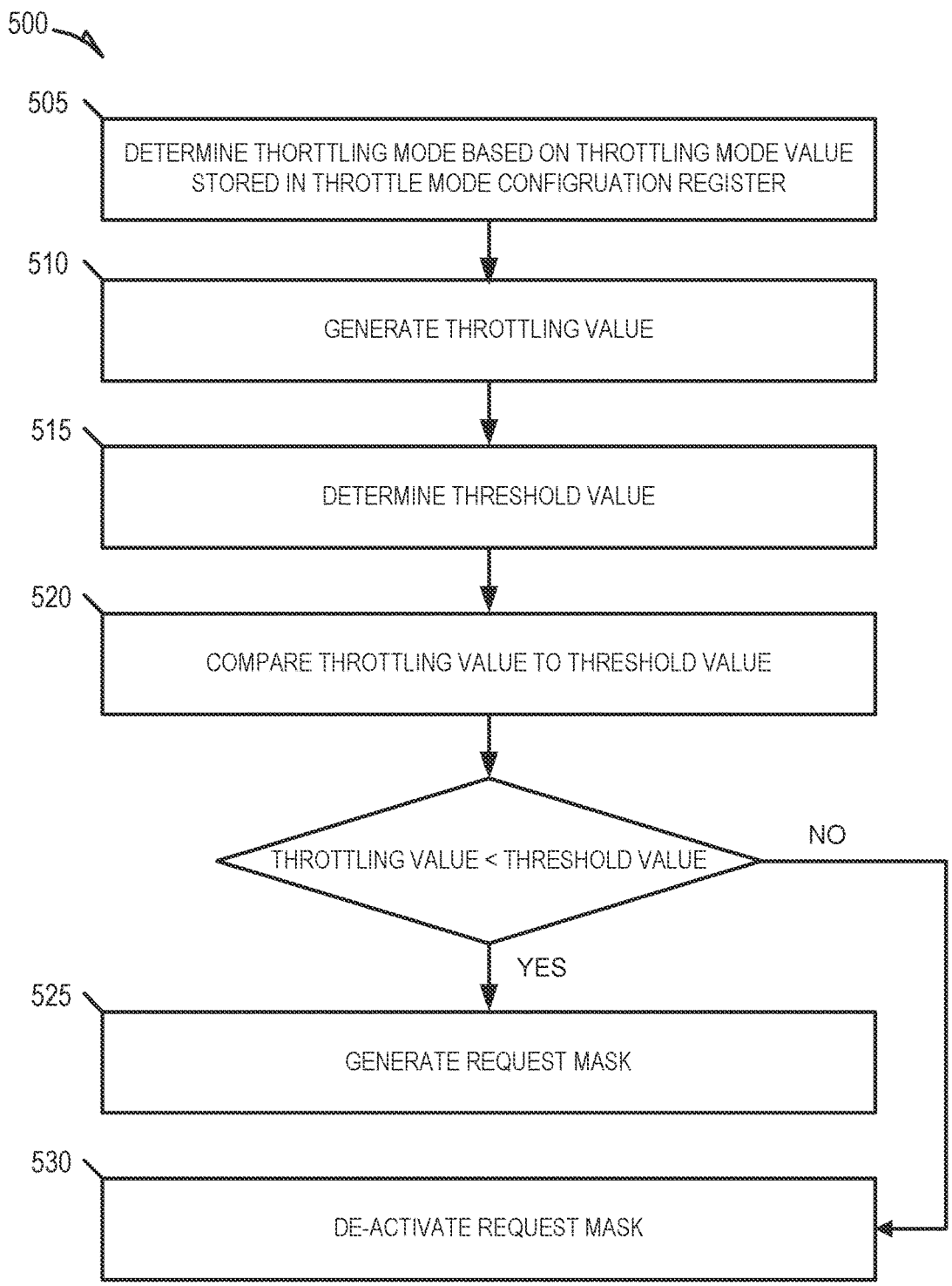
FIG. 5 is a flow diagram of an example method to activate a request mask, in accordance with some embodiments of the present disclosure.

FIG. 5 is a flow diagram of an example method to activate a request mask, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the buffer manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device determines a throttling mode that indicates a manner of throttling arbitration requests to an arbiter that manages access of multiple clients to a buffer memory. The processing device is responsible for throttling arbitration requests of a particular client. As discussed above, each arbitration request is generated in response to receiving an access request from the particular client requesting access to the buffer memory. The processing device can determine the throttling mode by accessing a throttling mode value stored in a throttling mode configuration register. The throttling mode value can be set based on external input or based on input provided by system firmware.

At operation 510, the processing device generates a throttling value. The processing device can be configured to operate in multiple throttling modes, and the processing device generates the throttling value according to the throttling mode to which the processing device is configured. For example, in a counter-based throttling mode, the processing device uses an incrementing counter as the throttling value. As another example, in a random-number-based throttling mode, the processing device generates a random (or pseudo random) number as the throttling value. Further details regarding the generation of the throttling value are discussed below in reference to FIG. 6.

At operation 515, the processing device determines a threshold value. The threshold value is stored in a threshold value register (e.g., threshold value register 300), and the processing device can determine the threshold value by accessing the value from the threshold value register. The threshold value can be determined by system firmware or based on external input (e.g., received via a CPU peripheral programming interface).

At operation 520, the processing device compares the throttling value to the threshold value. If, based on the comparison, the processing device determines that the throttling value is less than the threshold value, the processing device generates a request mask at operation 525. As discussed above, an incoming arbitration request is masked based on detecting the request mask.

If, based on the comparison, the processing devices determines that the throttling value is equal to or greater than the threshold value, the processing device de-activates the request mask at operation 530. As discussed above, if no request mask is detected, an incoming arbitration request mask is passed to an arbitration component (e.g., the arbiter 206) by the processing device.

Figure 6:
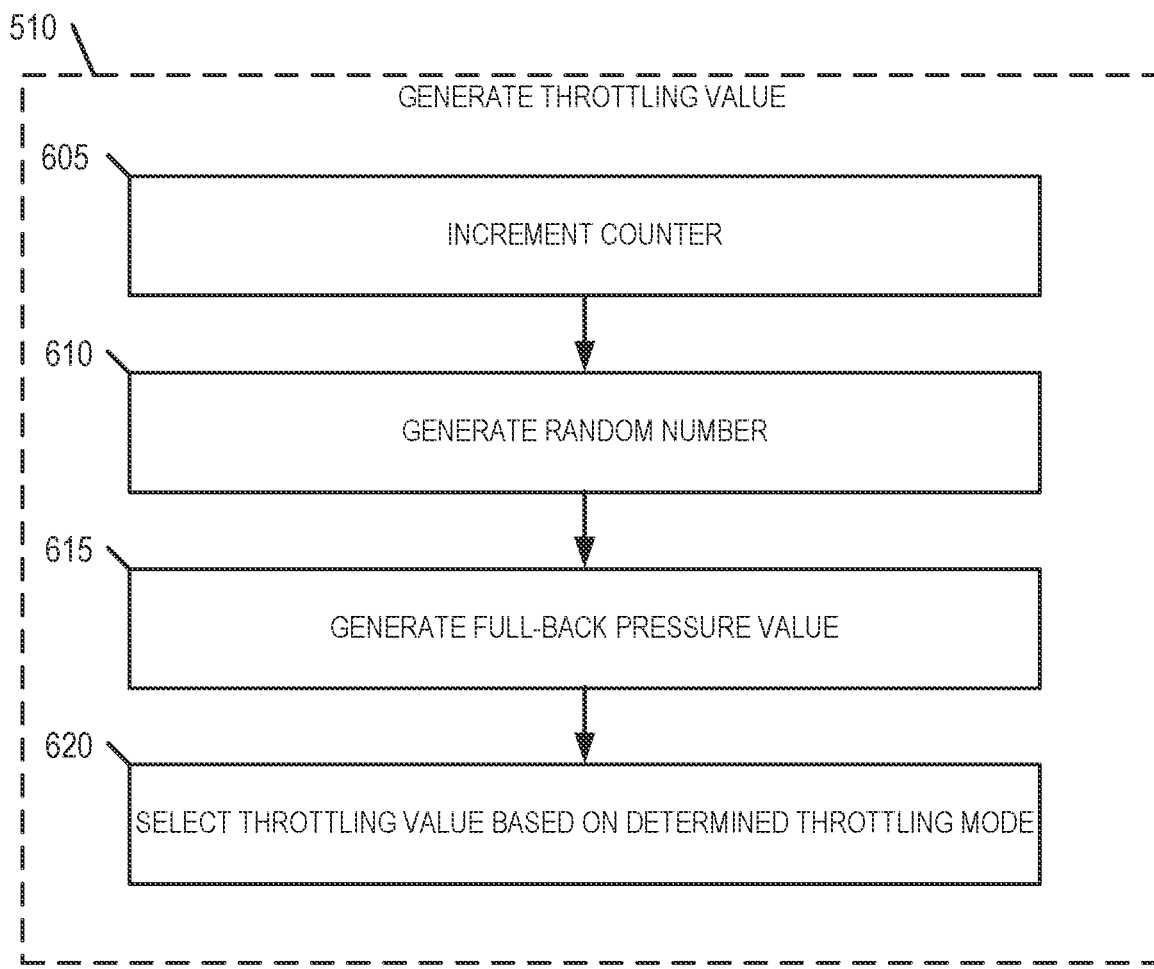
FIG. 6, is a flow diagram of an example method to generate a throttling value, in accordance with some embodiments of the present disclosure.

As shown in FIG. 6, the method 500 can, in some embodiments, include operations 605, 610.615, and 620. Consistent with these embodiments, the operations 605, 610.615, and 620 can be performed as part of operation 510, where the processing device generates the throttling value.

At operation 605, the processing device increments a counter. The counter can be incremented on a per-clock cycle or per-request basis. That is, the processing device can increment the counter each clock cycle or upon receipt of each arbitration request.

At operation 610, the processing device generates a random (or pseudo random) number. As discussed above, the processing device can utilize a LFSR-based random number generator to generate a pseudo-random number sequence, where the random number range is based on the width of the LFSR registers used. Accordingly, the generating of the random number can include accessing an output of a LFSR-based random number generator.

At operation 615, the processing device generates a full-back pressure value. As noted above, the full-back pressure value is, by design, less than the threshold value. Accordingly, in generating the full-back pressure value, the processing device accesses the threshold value from the threshold value register and decrements the threshold value by one or more units to generate the full-back pressure value.

At operation 620, the processing device selects the throttling value based on the determined throttling mode. In a first example, the processing device selects the counter as the throttling value while in a counter-based throttling mode. In a second example, the processing device selects the random number as the throttling value while in a random number-based throttling mode. In a third example, the processing device selects the full-back pressure value as the throttling value while in the full-back pressure mode.

Figure 7:
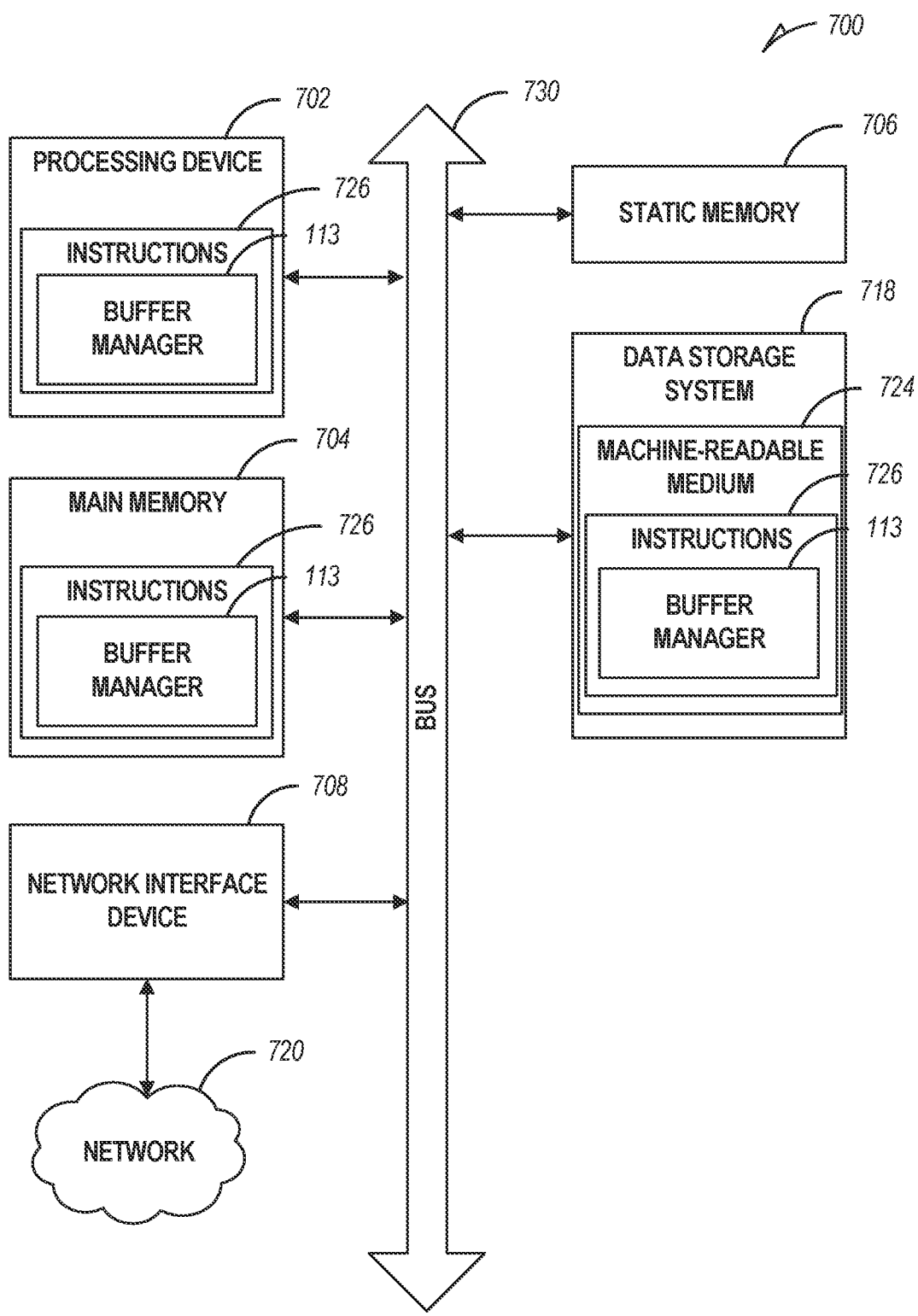
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the buffer manager 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an ASIC, a FPGA, a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a memory allocation system (e.g., the buffer manager 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs. and magnetic-optical disks, read-only memories (ROMs), random access memories (RAMs). EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM. RAM, magnetic disk storage media, optical storage media, flash memory components, and the like.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

EXAMPLES

Example 1 is a system comprising: a first memory component; and a processing device, operatively coupled to the first memory component, configured to perform operations comprising: determining a throttling mode that indicates a manner of throttling arbitration requests to an arbiter that manages access to the buffer memory by multiple clients, each arbitration request being generated in response to receiving an access request for the buffer memory from a particular client from among the multiple clients; generating a throttling value based on the throttling mode; comparing the throttling value to a threshold value; generating a request mask based on a result of comparing the throttling value to the threshold value; and in response to detecting the request mask, masking, using the request mask, an arbitration request from the client prior to passing the arbitration request to the arbiter.

In Example 2, the subject matter of Example 1 optionally comprises a threshold comparison register to store the threshold value, and the processing device determines the threshold value by accessing the threshold comparison register.

In Example 3, the subject matter of any one or more of Examples 1 and 2 optionally comprises a throttling mode configuration register to store a throttling mode value, and the determining of the throttling mode is based on the throttling mode value stored in the throttling mode configuration register.

In Example 4, the generating of the throttling value of any one or more of Examples 1-3 optionally comprises selecting one of a counter or a random number as the throttling value based on the determined throttling mode.

In Example 5, the generating of the throttling value of any one or more of Examples 1-4 optionally comprises incrementing the counter; and generating the random number.

In Example 6, the generating of the random number in Example 5 optionally comprises accessing an output of a linear feedback shift register (LFSR) based random number generator.

In Example 7, the throttling mode of any one or more of Examples 1-6, optionally comprises one of: a counter-based throttling mode, a random number-based throttling mode, and a full-back pressure throttling mode.

In Example 8, the subject matter of any one of Examples 1-7 optionally comprises generating the throttling value based on a counter-based throttling mode by accessing a counter that is incremented each clock cycle In Example 9, the subject matter of any one of Examples 1-7 optionally comprises generating the throttling value based on a random number-based throttling mode by accessing a random number.

In Example 10, the subject matter of any one of Examples 1-7 optionally comprises generating the throttling value based on a full-back pressure throttling mode by generating a full-back pressure value by decrementing the threshold value by at least one unit; and selecting the full-back pressure value as the throttling value.

Example 11 includes the subject matter of any one of the Examples 1-10 wherein the throttling value is optionally a first throttling value generated at a first clock cycle; the arbitration request is optionally a first arbitration request; and the operations optionally comprise: generating, at a second clock cycle, a second throttling value based on with the throttling mode; comparing the second throttling value to the threshold value; de-activating the request mask based on a result of comparing the second throttling value to the threshold value; and passing, during the second clock cycle, a second arbitration request to the arbitration component.

Example 12 is a method comprising accessing a throttling mode configuration register to determine a throttling mode that defines a manner of throttling arbitration requests to an arbiter that manages access to a buffer memory by multiple clients, each arbitration request being generated in response to receiving an access request for the buffer memory from a particular client from among the multiple clients; generating a throttling value in accordance with the throttling mode; determining a threshold value by accessing a threshold comparison register; comparing the throttling value to the threshold value; generating a request mask based on a result of comparing the throttling value to the threshold value; and in response to detecting the request mask, masking, using the request mask, an arbitration request from the client prior to passing the arbitration request to the arbiter.

In example 13, the generating of the throttling value of Example 12 optionally comprises selecting one of a counter or a random number as the throttling value based on the determined throttling mode.

In example 14, the generating of the random number in Example 13 optionally comprises accessing an output of a LFSR-based random number generator.

In example 15, the throttling mode of any one or more of Examples 12-14, optionally comprises one of: a counter-based throttling mode, a random number-based throttling mode, and a full-back pressure throttling mode.

In example 16, the subject matter of any one or more of Examples 12-15 optionally comprises generating the throttling value in accordance with a counter-based throttling mode by accessing a counter that is incremented each clock cycle.

In example 17, the subject matter of any one or more of Examples 12-16 optionally comprises generating the throttling value in accordance with a random number-based throttling mode by accessing a random number.

In example 18, the subject matter of any one or more of Examples 12-17 optionally comprises generating the throttling value in accordance with a full-back pressure throttling mode by: generating a full-back pressure value by decrementing the threshold value by at least one unit; and selecting the full-back pressure value as the throttling value.

Example 19 includes the subject matter of any one of Examples 12-18 wherein the throttling value is optionally a first throttling value generated at a first clock cycle; the arbitration request is optionally a first arbitration request; and the method optionally further comprises: generating, at a second clock cycle, a second throttling value in accordance with throttling mode; comparing the second throttling value to the threshold value; de-activating the request mask based on a result of comparing the second throttling value to the threshold value; and passing, during the second clock cycle, a second arbitration request to the arbitration component.

Example 20, A non-transitory computer-readable storage medium comprising instructions that, when executed by a processing device, cause the processing device to perform operations comprising: accessing a throttling mode configuration register to determine a throttling mode that defines a manner of throttling arbitration requests to an arbiter that manages access to a buffer memory by multiple clients, each arbitration request being generated in response to receiving an access request for the buffer memory from a particular client from among the multiple clients; generating a throttling value in accordance with the throttling mode; determining a threshold value by accessing a threshold comparison register; comparing the throttling value to the threshold value; de-activating a request mask based on a result of comparing the throttling value to the threshold value; and based on the request mask being de-activated, passing an arbitration request to the arbiter for arbitration.

What is claimed is:

1. A system comprising:
a memory device comprising a buffer memory; and
a processing device, operatively coupled with the memory device, to perform operations comprising:
selecting a throttling value, from a group of values, using a throttling mode value stored in a configuration register, the throttling mode value indicating a manner of throttling an arbitration request to an arbiter that manages access to the buffer memory by multiple clients, the arbitration request being generated in response to receiving an access request for the buffer memory from a client from among the multiple clients, the group of values comprising a counter incremented at each clock cycle, a full-back pressure value, and a random number;
generating a request mask based the throttling value; and
masking, using the request mask, the arbitration request from the client prior to passing the arbitration request to the arbiter.

2. The system of claim 1, further comprising a threshold comparison register to store a threshold value, wherein the processing device is to determine the threshold value by accessing the threshold comparison register.

3. The system of claim 1, further comprising the configuration register to store the throttling mode value, wherein the processing device accesses the throttling mode value from the configuration register.

4. The system of claim 2, wherein the operations further comprise comparing the throttling value to the threshold value, the comparing of the throttling value to the threshold value includes determining the throttling value is less than the threshold value.

5. The system of claim 1, wherein the full-back pressure value causes the request mask to be generated at each clock cycle.

6. The system of claim 2, wherein the operations further comprise:
generating the full-back pressure value by decrementing the threshold value by at least one unit.

7. The system of claim 1, wherein the selecting of the throttling value comprises selecting a counter that is incremented each clock cycle.

8. The system of claim 1, wherein the selecting of the throttling value comprises selecting a random number.

9. The system of claim 1, wherein selecting of the throttling value comprises accessing an output of a linear feedback shift register (LFSR).

10. The system of claim 1, wherein the operations further comprise determining a throttling mode based on the throttling mode value, the throttling mode comprising one of:
a counter-based throttling mode, a random number-based throttling mode, and a full-back pressure throttling mode.

11. The system of claim 1, wherein:
the throttling value is a first throttling value generated at a first clock cycle;
the arbitration request is a first arbitration request; and
the operations further comprise:
selecting, at a second clock cycle, a second throttling value;
comparing the second throttling value to a threshold value;
de-activating the request mask based on a result of comparing the second throttling value to the threshold value; and passing, during the second clock cycle, a second arbitration request to the arbiter.

12. A system comprising:
a memory device comprising a buffer memory; and
a processing device, operatively coupled with the memory device, to perform operations comprising:
selecting a throttling value, from a group of values, using a throttling mode value stored in a configuration register, the throttling mode value indicating a manner of throttling an arbitration request to an arbiter that manages access to a buffer memory by multiple clients, the arbitration request being generated in response to receiving an access request for the buffer memory from a client from among the multiple clients, the group of values comprising a counter incremented at each clock cycle, a full-back pressure value, and a random number;
generating a request mask based on a result of comparing the throttling value to a threshold value; and
masking, using the request mask, the arbitration request from the client prior to passing the arbitration request to the arbiter.

13. The system of claim 12, further comprising comparing the throttling value to the threshold value, the comparing of the throttling value to the threshold value includes determining the throttling value is less than the threshold value.

14. The system of claim 12, wherein the full-back pressure value causes the request mask to be generated at each clock cycle.

15. The system of claim 12, further comprising:
generating the full-back pressure value by decrementing the threshold value by at least one unit.

16. The system of claim 12, wherein:
the throttling value is a first throttling value generated at a first clock cycle;
the arbitration request is a first arbitration request; and
the operations further comprise:
selecting, at a second clock cycle, a second throttling value;
comparing the second throttling value to the threshold value;
de-activating the request mask based on a result of comparing the second throttling value to the threshold value; and
passing, during the second clock cycle, a second arbitration request to the arbiter.

17. The system of claim 12, wherein:
the throttling value is a first throttling value generated at a first clock cycle;
the arbitration request is a first arbitration request; and
the operations further comprise:
selecting, at a second clock cycle, a second throttling value;
comparing the second throttling value to the threshold value;
based on a result of the comparing, masking, using the request mask, the second arbitration request from the client prior to passing the second arbitration request to the arbiter.

18. A non-transitory computer-readable storage medium comprising instructions that, when executed by a processing device, cause the processing device to perform operations comprising:
selecting a throttling value, from a group of values, using a throttling mode value stored in a configuration register, the throttling mode value indicating a manner of throttling an arbitration request to an arbiter that manages access to a buffer memory by multiple clients, the arbitration request being generated in response to receiving an access request for the buffer memory from a client from among the multiple clients, the group of values comprising a counter incremented at each clock cycle, a full-back pressure value, and a random number;
generating a request mask based on the throttling value; and
masking, using the request mask, the arbitration request from the client prior to passing the arbitration request to the arbiter.

19. The non-transitory computer-readable storage medium of claim 18, wherein the full-back pressure value causes the request mask to be generated at each clock cycle.

20. The non-transitory computer-readable storage medium of claim 18, wherein:
the throttling value is a first throttling value generated at a first clock cycle;
the arbitration request is a first arbitration request; and
the operations further comprise:
selecting, at a second clock cycle, a second throttling value;
comparing the second throttling value to a threshold value;
de-activating the request mask based on a result of comparing the second throttling value to the threshold value; and
passing, during the second clock cycle, a second arbitration request to the arbiter.

* * * * *